United States Patent [19]

Pray

[11] 4,344,213

[45] Aug. 17, 1982

[54] RIVET GUIDING APPARATUS

[75] Inventor: Winston C. Pray, Lombard, Ill.

[73] Assignee: Flexible Steel Lacing Company, Downers Grove, Ill.

[21] Appl. No.: 115,367

[22] Filed: Jan. 25, 1980

Related U.S. Application Data

[63] Continuation-in-part of Ser. No. 948,971, Oct. 5, 1978, Pat. No. 4,258,461.

[51] Int. Cl.³ .......................................... B23P 19/00
[52] U.S. Cl. .................................... 29/243.5; 29/509; 29/526 A
[58] Field of Search .............. 29/243.51, 243.5, 243.52, 29/243.53, 243.56; 227/140, 141, 152, 154, 155; 145/46

[56] References Cited

U.S. PATENT DOCUMENTS

| | | | |
|---|---|---|---|
| 2,716,750 | 9/1955 | Biblis | 145/46 |
| 2,765,463 | 10/1956 | de Angura | 227/139 |
| 2,908,008 | 8/1959 | Potter. | |
| 2,911,645 | 11/1959 | Crossen. | |
| 3,125,905 | 3/1964 | Stein. | |
| 3,261,085 | 7/1966 | Hobson | 29/243.51 |
| 3,458,099 | 7/1969 | Schick | 227/111 |
| 3,478,567 | 11/1969 | Galutia | 72/457 |
| 3,581,350 | 6/1971 | McComb | 24/33 |
| 3,643,852 | 2/1972 | Kowalczyk | 227/149 |
| 3,816,895 | 6/1974 | Kuehn et al. | 29/200 P |
| 4,050,138 | 9/1977 | Stolz | 29/243.51 |
| 4,060,189 | 11/1977 | Vargo et al. | 227/53 |
| 4,111,080 | 9/1978 | Pray | 29/243.51 |

Primary Examiner—James L. Jones, Jr.
Attorney, Agent, or Firm—Fitch, Even, Tabin, Flannery & Welsh

[57] ABSTRACT

Fasteners, such as rivets, are held and guided by a moveable guide block mounted over a plurality belt fasteners for driving through openings in the belt fasteners and into the underlying belt. The belt fasteners are held onto the base means by a clamping bar. The preferred guide block has a groove to receive the clamping bar and the guide block also has a pair of lateral ears to engage belt clamp bars for the purpose of aligning the block relative to the openings in the belt fasteners. A driving pin from a hammer or the like drives the fasteners from the guide block and into and through the openings in the belt fasteners.

17 Claims, 12 Drawing Figures

RIVET GUIDING APPARATUS

This application is a Continuation-In-Part Application of Co-Pending Application entitled "Method And Apparatus For Applying Belt Fasteners To A Belt", Ser. No. 948,971, filed Oct. 5, 1978 now Pat. No. 4,258,461.

This invention relates to an apparatus for securing a belt fastener by rivets to a belt end and to a means for receiving and guiding the rivets.

The present invention is directed to the securing of belt fasteners, such as, hinge or plate belt fasteners to a conveyor belt end by means of rivets piercing the belt and having enlarged heads formed at the upper and lower ends of the rivets. The present invention will be described hereinafter in connection with the use of plate belt fasteners and more particularly to an improved belt fastener apparatus of the kind generally shown in the above-identified co-pending application.

As fully described in that application, strings of plate belt fasteners covering, e.g., twenty-four, forty-two or sixty inch belt widths are secured to the abutted belt ends by rivets. The driving of the rivets in a straight path perpendicular to the belt, particularly where the belt is relatively heavy or formed with tough cores is a difficult job. The apparatus in the foregoing application employs a series of anvils located on the base means below the lower belt plate fasteners for upsetting the lower ends of the hollow rivets to form the lower head on the rivet.

A pointed nail is attached to the lower end of the hollow rivet and assists in piercing the belt and locating the rivet on the anvil which automatically separates the rivet ends from the nails as the lower rivet head is being formed by the anvil. For each of the larger size plate fasteners, there are fourteen rivet-nail fasteners which needed to be driven through the belt, and for a wide belt, the number of nail rivet fasteners to be driven is quite large. In order for each of these rivet nail fasteners to be driven properly, it should be positioned perpendicularly to the top of the belt and driven along a straight vertical path through the aligned apertures in the upper and lower belt plate fasteners. Because heavy blows are needed and because of the danger of hitting one's hands or fingers is present, it sometimes occurs that the nails are not properly positioned perpendicular to the belt and do not move along the desired vertical path. In such instances, the slanted rivets will not seat properly on the underlying anvil. This may necessitate removing the misaligned rivet and trying again. Further, it is often desired, to use power tools, such as an air hammer, to drive the rivet-nail fasteners through the belt.

The present invention is directed to simplifying the above task and provides a rivet-nail guide block means which may be loaded with the plurality of rivet-nail fasteners and which holds the rivet fasteners in alignment with respect to the various apertures in several upper and lower belt fastener plates. The guide block means is precisely located and registered in a position on the upper belt fasteners and has surfaces to center each rivet-nail fastener over apertures in the upper and lower plates. The guide block means may be quickly loaded with a large number of rivet-nail fasteners which may be quickly driven therefrom. The present invention also facilitates the use of a power tool for driving the rivet nail fasteners. Because it is not necessary to manually hold and align the rivet nail fasteners individually, the entire process may be speeded up.

Accordingly, a general object of the invention is to provide a new and improved belt fastener apparatus of the foregoing kind.

A further object of the invention is to provide a new and improved guide block means for receiving and guiding a plurality of rivet fasteners.

These and other objects and advantages in the present invention will become apparent from the following detailed description when taken in connection with the accompanying drawings in which:

Figures 5, 6:
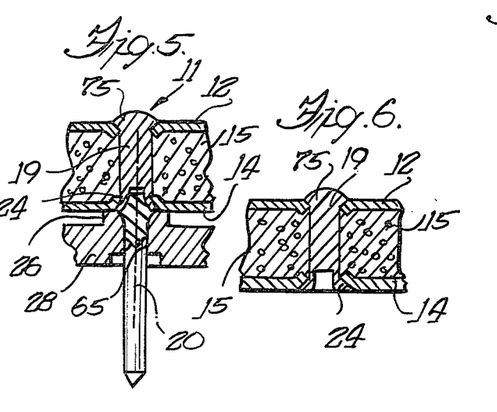
FIG. 5 is a cross sectional view showing a rivet-nail fastener in cooperation with an anvil means.
FIG. 6 illustrates upper and lower belt plate fasteners secured to belt ends by a rivet.

As shown in the drawings for purposes of illustration the invention is embodied in an apparatus for holding and aligning a plurality of fasteners 11 (FIG. 5) such as rivet fasteners for securing upper plate belt fasteners 12 and lower plate belt fasteners 14 to opposite sides of a belt end 15. Herein, the upper plate belt fasteners 12 are identical in size and shape and are separate and discrete from the lower plate belt fasteners 14 whereas in the hinge-type belt fasteners the upper and lower plates are joined together by a common interconnecting hinge portion at one end of the respective upper and lower plates. As will become apparent herein and from the following claims, the generic concept of the invention is applicable to both the hinge-type fasteners and to the non-hinge-type belt fasteners.

When using the non-hinge fasteners 12 and 14 illustrated herein, each plate belt fastener is attached to a pair of belt ends 15 and 15a which are aligned and abut at a common central vertical interface 16 (FIG. 8) bisecting the belt fasteners into equal halves so that a first set of apertures 17 on one side of the belt plate fasteners receive rivet fasteners for securing into a first belt end 15 while the second set of apertures 18 receive rivet fasteners for attaching the belt plate fasteners to the other belt end 15a. Thus, each plate belt fastener joins the belt ends 15 and 15a together.

Figure 7:
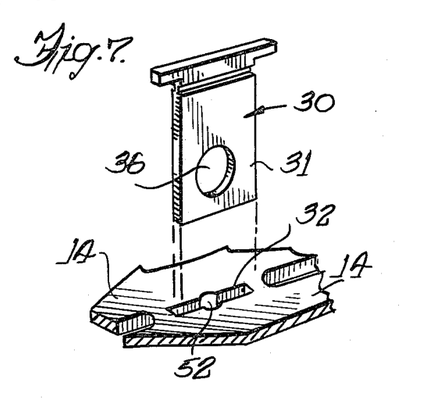
FIG. 7 illustrates a clip used for securing the lower plate fasteners to the base means.

The present invention is directed to improvement of the method and apparatus disclosed in United States Patent Application, Ser. No. 948,971 filed Oct. 5, 1978, which is hereby incorporated by reference as if fully reproduced herein. The aforementioned patent application discloses an apparatus, which is now commercially available, for securing the belt fasteners 12 and 14 to opposite sides of the belt ends 15 and 15a with rivet fasteners 11 which are formed with an upper separable rivet 19 attached to a depending nail 20 which separates from the upper rivet 19 as a lower rivet head 24 is formed and set by an anvil 26 on a base means 28 of the apparatus, as described in greater detail in the aforementioned patent application. Also, as described in detail in the aforementioned patent application, the lower belt fasteners 14 rest on the base means and are secured thereto against shifting relative to the anvils 26 by clips 30 (FIG. 7) having a depending apertured plate 31 inserted through a groove 32 formed between adjacent lower plate fasteners 14 and through an aligned groove in the base means. A locking cam rod 38 (FIGS. 1 and 2) is inserted through apertures 36 in the clips to lock and clamp the lower plate fasteners securely to the base means and on to the anvils 26.

Figures 9, 10:
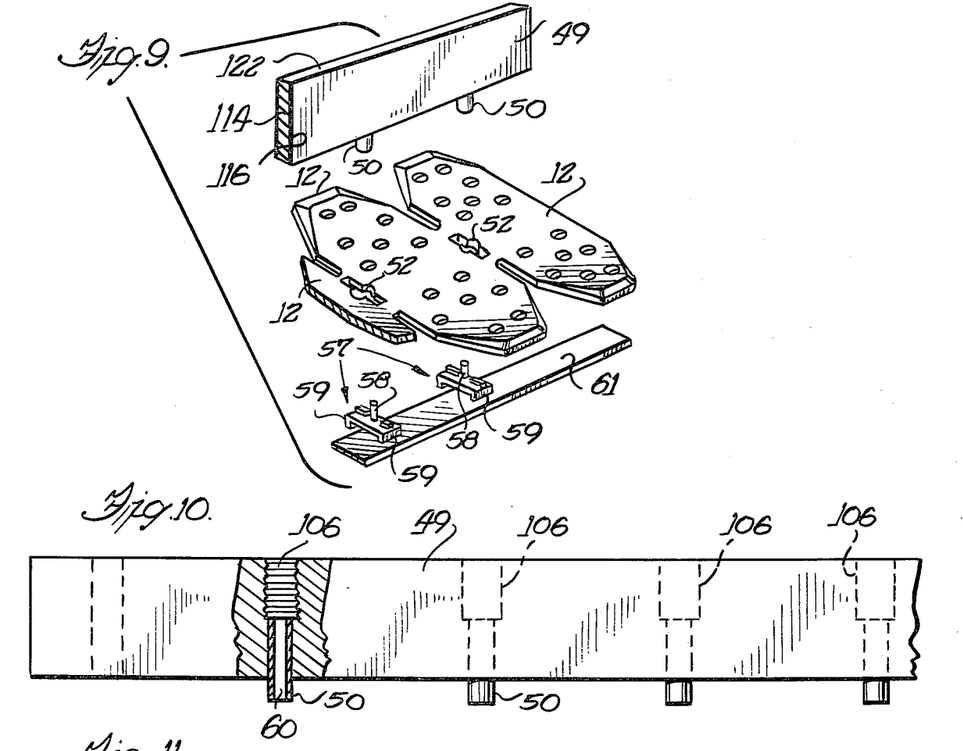
FIG. 9 is an exploded diagramatic view of the preferred means for attaching the upper strip of belt fasteners to a clamping bar.
FIG. 10 is a side elevational view of a preferred clamping bar.
Figure 11:
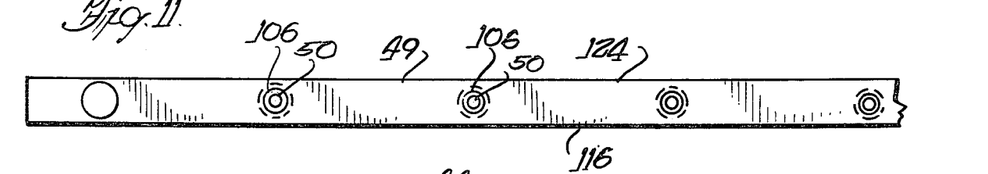
FIG. 11 is a bottom view of the clamping bar of FIG. 10.
Figure 12:
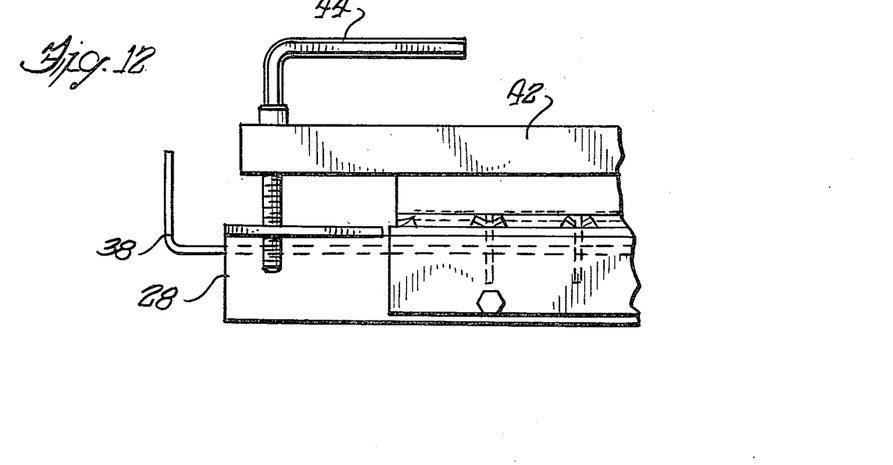
FIG. 12 is a partial, elevational view of the apparatus of FIG. 1.

After such locking of the lower plate fasteners 14 to the base means 28, the belt ends 15 and 15a are abutted at their interface 16 and are clamped to the base means by means of a pair of laterally extending belt clamp bars 40 and 42 (FIG. 1) which are secured to the base means by threaded locking handles 44. In the aforementioned patent application, the upper plate fasteners 12 are assembled onto and secured to a bar or rail 49 (FIGS. 9-11) which has registering means in the form of projections 50 thereon for insertion into circular openings 52 (FIGS. 1 and 7) between pairs of adjacent plate fasteners 12 for locating a string of joined plate fasteners onto the bar. The plate fasteners are assembled onto the bar while it is inverted with its projections 50 pointed upwardly. Then a series of strip holding clips 57 are placed over the plate fasteners with pins 58 on the clips inserted into the hollow interior bores 60 of the projections on the bar 49 to releasably hold the plate fasteners on the bar when it is subsequently inverted and placed in position over the belt ends 15 and 15a. The strip clips 57 have flexible flanges 59 into which is inserted a plastic strip or ribbon 61 which will be placed over the interface 16 between belt ends 15 and 15a to prevent sifting of the conveyed material down through the crack at the interface 16.

It will be appreciated that for many belts and particularly for thicker or multi-ply belts or belts with wire strands therein that it will be difficult to start the nail 20 in correct vertical alignment and to hold this alignment while driving the nail 20 through the belt. Also, the belt tends to bulge and to be compressed while the adjacent rivets are driven and thus to interfere to a certain extent with the driving of an adjacent rivet. Yet, it is most desirable that the nail 20 be centered in the aperture of the lower fastener plate and be centered in a bore 65 of an anvil which upsets the lower end of the rivet. For the tougher and heavier belts, heavy impact forces may be applied to the rivet fasteners, and, indeed a power-operated hammer may be desirable. In such cases, there is a need for means to assist in guiding the rivet fasteners.

Figure 4:
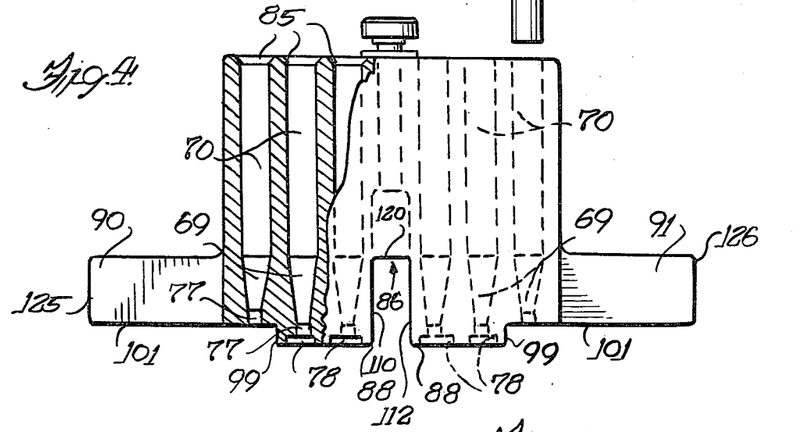
FIG. 4 is a side elevational view, partially in section, showing the passageways for receiving and containing the rivet-nail fasteners.

In accordance with the present invention, the rivet fasteners 11 are held and guided through the upper plate fasteners 12 and the belt end by a guide block 68 which is mounted on and held in a predetermined relationship to the base means 28 and to the belt fasteners 12 and 14 to hold and to guide the rivet fasteners 11 for substantially straight vertical paths of travel. Preferably, the rivet fasteners are shorter than the vertical passageways or bores 70 in the guide block so that a driving pin or hammer 71 (FIG. 4) may be inserted into the bore 70 and aligned vertically before applying a blow to the upper head of the rivet. To aid in centering, the nails and the rivets the lower portions of the guide block bores 70 are tapered downwardly to a tapered section 69 leading to a reduced cross sectional section 77 slightly smaller than the nail diameter to generally center the nails on the vertical center lines for the bores. By making the blocks of elastomeric material, the larger diameter upper rivet head 75 (FIG. 5) is allowed to be forced through the smaller diameter exit of the tapered portion. Also, enlarged recesses 78 (FIG. 4) are formed at the bottom of the bores 70 to prevent tearing of the elastomeric material from the guide block by the exiting rivet heads.

To properly align the guide block 68 with the plate fasteners 12 and 14 and to hold the same in this position, the preferred guide block is secured by means such as threaded fasteners 84 to the clamping bar 49 which also fits into elongated groove or channel 86 in the central bottom portion of the block. Also, to assist in holding the alignment of the guide block relative to the belt fasteners 12 and 14, the guide block has means in the form of lateral ears 90 and 91 which extend laterally to abut the belt clamp bars 40 and 42 and hold the guide block centered between the belt clamp bars.

The preferred guide block 68 is filled with rivet fasteners, e.g., fifty-six rivet fasteners 11 for four large-size plate fasteners 12 and then using a punch 71, the operator drives each nail from its bore 70 in the block through the belt. This speeds the operation considerably when such a large number of rivet fasteners are needed for a pair of belt ends.

Referring now in greater detail to the illustrated embodiment of the invention, the guide block 68 is preferably a block-shaped body which is molded of one piece and formed of material such as plastic, rubber or other elastomeric material. The illustrated material is a synthetic rubber material. The preferred fastener receiving bores 70 are formed during the molding of the block and the upper ends 85 of the bores are countersunk to a large diameter to facilitate insertion of the rivet fasteners 11 into the bore 70 which has a relatively constant diameter, such as, for example, about 0.332 inch. In this instance and by way of example only, the lower tapered portion 69 of the bore 70 begins at about one-inch above a bottom wall 88 for the guide block and tapers downwardly for three-fourths of an inch to a small diameter end 77 which is 0.109 inch, in this instance. It has been found that if the small diameter end 77 extends to the bottom wall 88 of the guide block that the heads 75 of the rivets will pinch the elastomeric material against the underlying plate fastener 12 and tear the bottom wall 88. However, when the enlarged recesses 78 are formed at the bottom of the bores 70 and in the bottom walls 88 that there is no material to be pinched thereby preventing the tearing of the bottom walls. By way of example only, the bottom recesses 78 are the same diameter as the main bore, viz., 0.332-inch diameter. By way of illustration only, the nails have a diameter of 0.114 inch and the rivet heads 75 have a diameter of 0.312 inch. Thus, the bores 78 center the rivet heads 75 and the nails are stopped from falling from the block when the nail tips hit the end sections 77 in the guide block.

Figure 8:
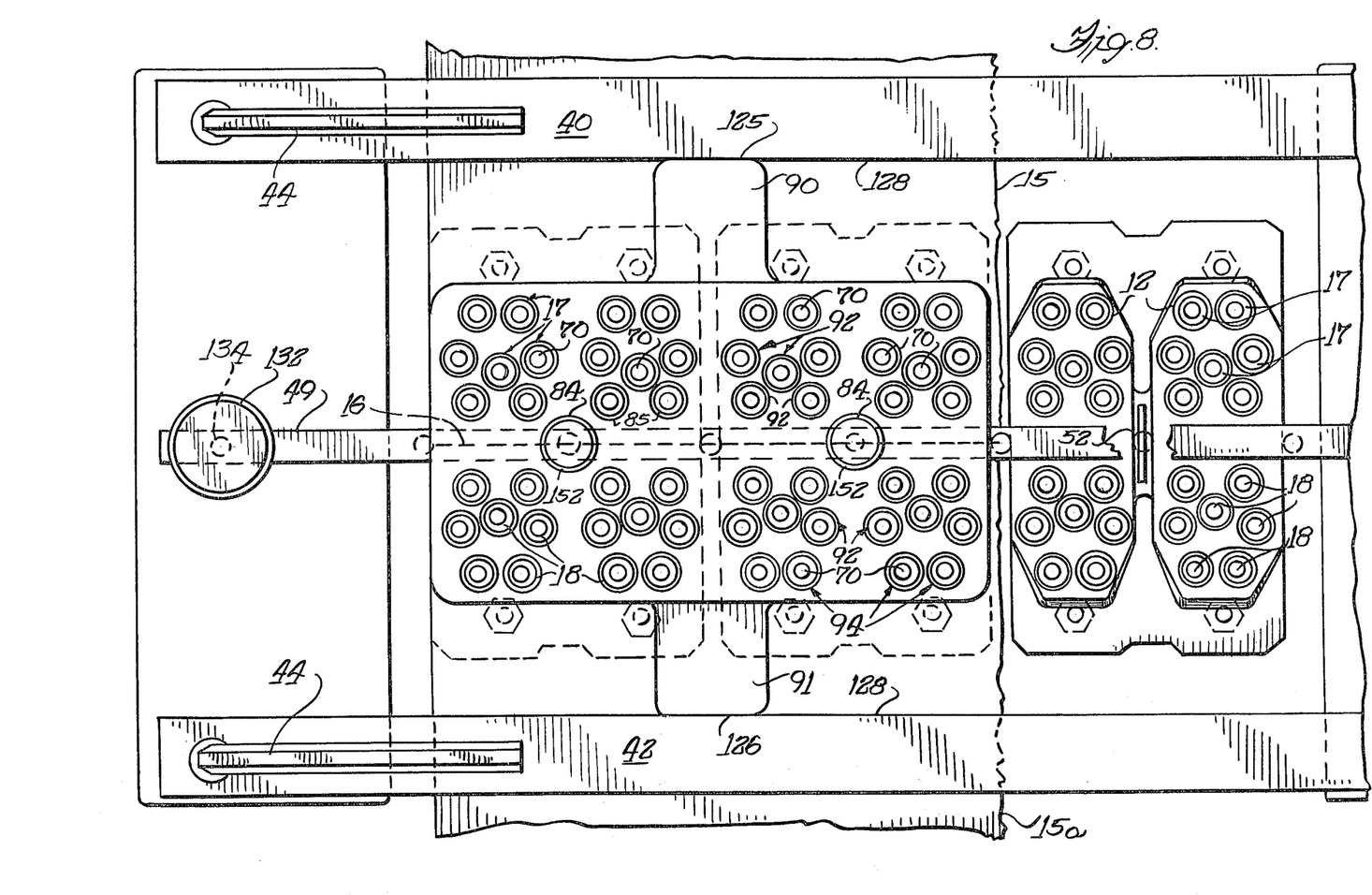
FIG. 8 is an enlarged elevational view of the guide block means position over the upper plate fasteners and being secured in a registered position relative to the apertures in the belt plate fasteners.

The guide block 68 facilitates the aligning and the driving of the rivet fasteners 11 and, in this instance, the guide block 68 may hold as many as fifty-six rivet fasteners for four plate fasteners 12. The illustrated guide block is capable of handling two different sizes of plate fasteners. When using the smaller plate fasteners, the interior ten bores 70 designated by the general reference characters 92 in FIG. 8 are used for each small plate fastener. When using the illustrated larger plate fasteners, the additional outer bores designated by the general reference character 94 are used along with the interior ten bores to provide a total of fourteen bores 70 in use. In either event, the number of rivet fasteners, ten or fourteen, per belt fastener is relatively large and when the belt ends take ten or more belt fasteners, the aligning of the fasteners becomes time-consuming if done manually without the guide block means of the present invention.

Figures 1, 2:
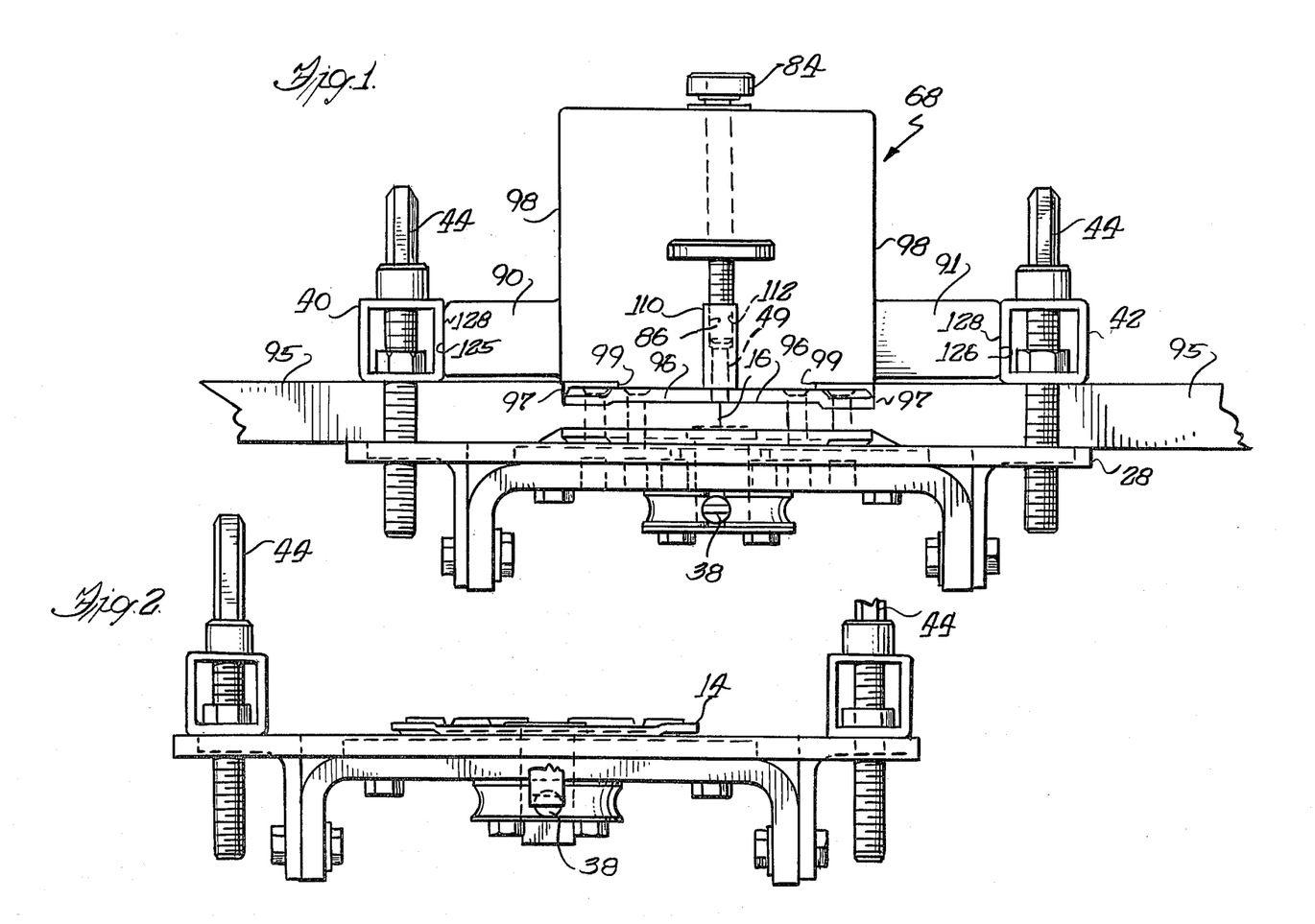
FIG. 1 is an end view of an apparatus having a guide block means and an embodying the novel features of the present invention.
FIG. 2 is an end view of the apparatus of FIG. 1 without the guide block means thereon.
Figure 3:
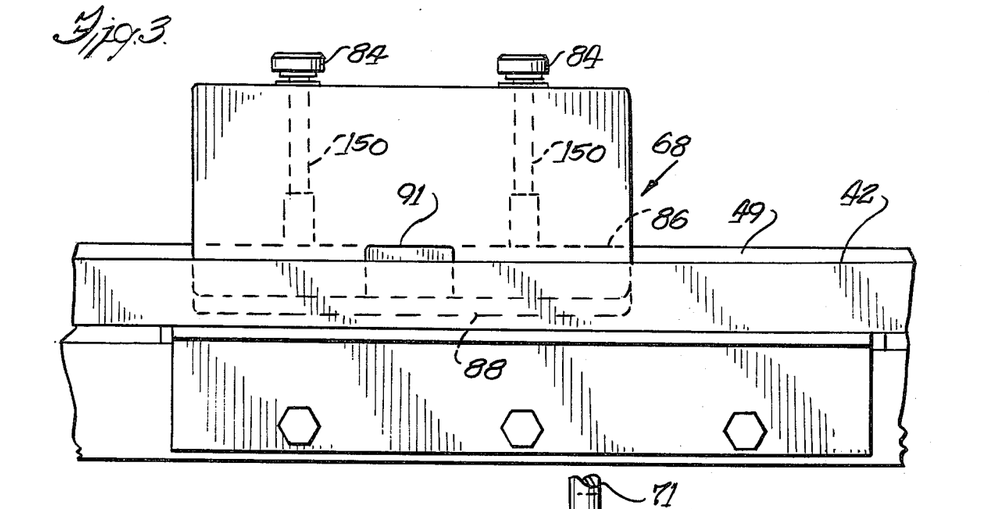
FIG. 3 is a side elevational view of a guide block means mounted in position on a bar for clamping the upper plate fasteners to the belt.

Preferably, the belt ends 15 and 15a are cut with transverse undercuts at belt ends to place the fasteners 12 and rivet heads 75 below the top plane or surfaces 95 of the belt ends (FIG. 1). The undercuts define a wall 96 parallel to the top belt surfaces 95 and a vertical shoulder wall 97 between the walls 96 and the top surface 95. When using the illustrated larger belt fasteners 11, the vertical side walls 98 of the guide block are aligned with the vertical shoulder walls 97 of the undercut in the belt end. When using the smaller plate fasteners, a smaller undercut is used and the shoulder walls of the undercut are aligned with shoulder walls 99 on the guide block and are slightly spaced therefrom and parallel thereto thereby allowing the guide block to drop into the undercuts, and in some instances, the bottom walls 101 on the guide block ears 90 and 91 abut the top surfaces 95 of the belt ends 15 and 15a. The outer two fastener receiving bores 70, also generally designated as 94, on each side of the ten interior bores ae shorter in length and are not used when the central bottom wall 88 of the guide block rests on the short belt fasteners (not shown). Thus, the plate fasteners 12 and 14 may be placed in grooves formed by slicing away an undercut in the upper rubber face of the conveyor belt above the body of the belt to allow the plate fasteners to be disposed at a level equal to or beneath the top surface of the belt so that the rivet heads and the belt fasteners are not worn as quickly as they are when they are superimposed onto the belt without any relief cut into the belt therefor.

It will be recalled that the guide block 68 is secured to the clamping bar by bolts 84 and to this end, threaded bores 106 (FIG. 10) extend downwardly into the bar to receive the lower ends of the threaded bolts 84. Preferably, one threaded bore 106 is located over and coaxially aligned with each of the depending projections 50 extending from the underside 110 of the bar. Since the depending projections 50 project into the holes 52 located centrally between a pair of adjacent plate fasteners, the threaded bolts 84 are likewise centered over the openings 52 between the plate fasteners and thereby center the guide block 68. More specifically, as seen in FIG. 8, the threaded bores and the bolts 84 are located with the left hand bolt located centrally between a lefthand pair of belt fasteners and the righthand threaded bore and bolt 84 is positioned midway between the righthand pair of plate belt fasteners. Thus, by threading the bolts 84 into the threaded bores 106 in the bar, the guide block means is located in a predetermined position along the length of the guide bar 49.

Also, because the guide bar 49 is inserted into the channel 86 formed at the bottom of the guide block, the guide block is also centered in a transverse direction by the guide bar 49. More specifically, the guide block channel 86 is defined by a pair of vertical side walls 110 and 112 (FIGS. 1 and 4) which abut the upstanding sidewalls 114 and 116 (FIGS. 9 and 11) of the guide bar. A top horizontal wall 120 for the channel 86 may rest on the top wall 122 of the guide bar 49. Thus, the guide bar and guide block are interfitted and interrelated to each other to locate with precision the guide block relative to the plate fasteners and to the anvils 26 on the base means 28 for forming the lower rivet heads 24.

The ear portions 90 and 91 of the guide block also assist in locating and stabilizing the guide block relative to the belt fasteners 12 and 14 and to the anvils 26 on the base means 28. To this end, the outer ends 125 and 126 (FIGS. 1 and 8) are abutted against the inner facing vertical side walls 128 of the respective belt clamping bars 40 and 42. The ear portions 90 and 91 are of use in that the bar 49, even though made of steel, is relatively flexible because of its long length between its ends which are secured by threaded bolts 132 (FIG. 8) into a threaded openings 134 in the base means 28. The preferred closed channel belt clamp bars 40 and 42 are fairly stiff and rugged and do not deflect as easily as the bar 49 under the hammering forces. Herein, the belt clamp bars may be formed with vertical holes through which nails may be driven into the underlying belt ends 15 and 15a to hold the belt interfaces 16 abutted.

The illustrated, four position guide block 68, is relatively a small device or apparatus in that it is about 6.61 inches in the longitudinal direction and about 6.72 inches in the transverse direction between end walls 125 and 126 for the ears 90 and 91. The illustrated guide block 68 is about 3.25 inches in height. It is to be appreciated that the guide block may be changed considerably in size and shape from that illustrated herein and still fall within the purview of the invention. Further, if desired, the one-piece guide block disclosed herein may be made of multiple pieces. Also, the rivet receiving bores 70 could be provided with metallic chucks or collets. Further, the means registering, i.e., positioning and locating of the guide block relative to one or more of the belt plate fasteners 12, or the clamping bar 49 or base means 28 may be changed from that illustrated herein and still fall within the purview of the appended claims.

Briefly, recapitulating the use of the illustrated apparatus, the lower belt fasteners may be assembled over the anvils 26 and secured thereto by the clips 30 and the cam locking rod 38, all as described in greater detail in the aforementioned co-pending application. The upper belt fasteners are easily positioned on the bar 49 by insertion of the projections 58 (FIG. 9) on plastic clips 57 into the hollow bores 60 of the projections 50 on the bar 49. Each of the projections 50 is inserted through an aperture 52 between adjacent belt fasteners 12 and these projections assure an alignment or registering of the bar relative to the strip of plate fasteners being attached thereto. The plastic bodies of the little clips are inserted into the slots between adjacent fasteners and have portions 59 to grip a plastic ribbon 61, which will prevent material on the conveyor belt from sifting through the crack as the interface 16 between the belt ends 15 and 15a.

The clamping bar 49 with the strip of upper belt fasteners 12 so attached thereto is then inverted and positioned over the top surfaces 95 of the belt ends and is secured in alignment with the base means 28 by the threaded bolts 132 threaded into the apertures 134 in the base means. The threaded apertures 134 located on the centerline of the base means and over the centers of the belt fasteners when their apertures are aligned with the anvils 26 on the base means.

The belt clamping bars 40 and 42 will have been clamped to the top of the belt ends by the use of the threaded handles 44 which are also threaded into the base means 28 so that the clamp bars are located precisely relative to the anvils 26 and the fastener 14 thereon. Then the guide block 68 is positioned over four of the upper plate fasteners 12 and pushed down with the channel 86 receiving the clamping bar therein. The ends 125 and 126 on the ears 90 and 91 are slid down along the inner facing sides 128 of the pair of belt clamp bars 40 and 42. The guide block is shifted longitudinally along the clamping bar 49 until the two bores 150 in the guide block are aligned over a pair of threaded bores 106 in the clamping bar. Then, by turning the enlarged heads 152 on the screws 84 the lower threaded ends thereof are threaded into the bores 106. The heads 152 may be turned down to abut the top of the guide block body and and to clamp the same to the bar 49.

Each of the bores 70 in guide block body is then loaded with a rivet fastener. Then a punch 71 is applied to the top head 75 of the rivet fastener 11 to drive the nail 20 downwardly through an aperture in the upper belt plate fastener 12 and through the belt end and apertures in the lower plate fastener 14. As the nail 26 enters the opening in the anvil 26, it also guides its attached rivet 19 to a centered position on the anvil which has cam surfaces for flaring the hollow lower end of the rivet to form the lower rivet head 24 to abut the underside of the belt fastener plate 14. As the rivet heads 24 are formed, the nails detach from their associated rivets.

Because the rivets and nails are driven straight from the guide block and are precisely aligned over the apertures in the upper and lower belt fasteners, there has been found to be less separation of the rivets from the nails than experienced heretofore. Further, the guide block assists in centering the lower end of the rivet onto the anvil 26 on the base means to form more perfect lower ends for the rivets.

From the foregoing, it will be seen that the guide block means of the present invention may interconnected to the base means in alignment with anvils on the base means and used to receive and to guide rivet fasteners into and through upper and lower plates of belt fasteners. The apparatus aids also in reducing the down time of the conveyor by increasing the speed at which a belt splice can be made with these types of belt fasteners.

The present invention has been described in terms of the preferred embodiment, but certain changes may be made, some of which may immediately be apparent and others of whih may be apparent only after some study, without departure from this invention.

What is claimed:

1. An apparatus for holding and the aligning plurality of elongated rivet fasteners for driving through apertures in an upper belt fastener plate and through a belt and into apertures in a lower belt fastener plate, said apparatus comprising:

a base means for supporting the belt and a row of belt fasteners thereon and having anvil means thereon for deforming the lower ends of said rivet fasteners, a guide block shorter in length than said base means for positioning over the upper belt plate fasteners and moveable laterally on said base means through a plurality positions on said base means, a plurality of elongated vertically extending passageways in said guide block, each for receiving an elongated fastener and for guiding the same in vertical movement into the apertures in the upper plate fasteners and through the belt to the apertures in the lower plate fastener, means for registering said guide block in each of a plurality of positions relative to said base means and for interconnecting said base means and said guide block to locate said guide block in alignment with the anvil means on said base means in each position and in alignment with the apertures in the upper plate fasteners and thereby with respect to apertures in said lower plate fasteners.

2. An apparatus in accordance with claim 1 in which said means for registering said guide block and interconnecting said base means and said guide block means comprises clamping means secured to said base means and extending across and clamping said upper plate fasteners against said belt, and in which means secure said guide block to said clamping means.

3. An apparatus in accordance with claim 1 in which the guide block has downwardly tapered passageways in the lower end thereof to center the rivet fasteners over the apertures in the upper plate of the belt fastener.

4. An apparatus in accordance with claim 3 in which said guide block is formed of a resilient elastomeric material which is expandable at the lower ends of said tapered passageways to release the fasteners and in which the enlarged recesses are formed at the lower ends of said tapered passageways to prevent tearing of the elastomeric material when the rivet fasteners are being driven from the guide block.

5. An apparatus in accordance with claim 1 in which said means for registering said guide block and for interconnecting said base means and said guide block comprises an elongated bar extending across the central portions of the upper plate fasteners, means for releasably securing the bar to said base means and for exerting a clamping pressure on the upper plate fasteners, and means for securing the guide block thereon in a predetermined relationship with respect thereto.

6. An apparatus in accordance with claim 5 in which registering means on said bar engages the upper plate fasteners to register the bar with respect to the upper plate fasteners and thereby register the guide block with respect to the upper plate fasteners.

7. An apparatus in accordance with claim 1 in which a belt clamp means clamps the belt to said base means and in which a positioning means extends between the guide block and said belt clamp to assist in positioning the guide block.

8. An apparatus for applying fasteners to a set of upper and lower plate belt fasteners with a belt therebetween, said apparatus comprising:

a base means underlying and holding the lower belt fasteners in a row and in predetermined relationship to the belt end, a clamping bar positioned over the tops of the upper plate fasteners and secured to the base means to hold the row of belt fasteners, registering means on said clamping bar for registering engagement with each the upper plate fasteners in said row, a guide block having a plurality of apertures each for receiving and holding a fastener therein and for guiding the same for downward movement into and through the belt and aligned apertures in the respective upper and lower plate belt fasteners, said guide block being shorter than said base means and moveable along said clamping bar through a plurality of positions and means for securing said guide block to said clamping bar and in alignment with the apertures in the upper belt fasteners.

9. A guide block for use with belt fastener plates having an array of apertures therein each to receive a fastener, said guide block comprising:

a block body for positioning over the belt body and having a plurality of elongated vertically extending passageways therein disposed in array complementary to the array of apertures, each of said passageways receiving an elongated fastener and for guiding the same in a vertical movement, means in the lower ends of said passageways for centering and holding the fasteners; said guide block body being formed of an elastomeric material and in which enlarged openings are formed in the bottom of said passageways to allow the fasteners to leave the elastomeric body without pinching off a piece of the lower bottom wall;

registering means on said guide block for registering the guide block relative to the belt fastener plates with the apertures in alignment with the passageways in said guide block body, and means associated with said guide block body for securing said guide block in the registered position over said plate fasteners and against movement during the driving of the fasteners from the passageways and into and through the apertures in the belt fastener plates.

10. A guide block apparatus in accordance with claim 9 in which said registering means includes a pair of laterally extending ears for abutting belt clamp bars.

11. A guide block apparatus in accordance with claim 9 in which said means in the lower ends of said passageways includes downwardly tapered passageways leading to a small diameter end sections.

12. An apparatus for holding and the aligning plurality of elongated rivet fasteners for driving through apertures in an upper belt fastener plate and through a belt and into apertures in a lower belt fastener plate, said apparatus comprising:

a base means for supporting the belt and the rivet fasteners and having anvil means thereon for deforming the lower ends of said rivets, a guide block for positioning over the upper belt plate fasteners and having a plurality of elongated vertically extending passageways therein each for receiving an elongated fastener and for guiding the same in a vertical movement into the apertures in the upper plate fasteners and through the belt to the apertures in the lower plate fastener, means interconnecting said base means and said guide block to locate said guide block in alignment with the anvil means on said base means and in alignment with the apertures in the upper plate fasteners and thereby with respect to apertures in said lower plate fasteners, said registering means on said bar engaging the upper plate fasteners to register the bar with respect to the upper plate fasteners and thereby register the guide block with respect to the upper plate fasteners, said means for securing said guide block on said bar comprising a plurality of screw threads in said bar at predetermined spacings and threaded fasteners on said guide block for threading into said screw threads to locate the guide block in each of a series of positions over the clamp bar.

13. An apparatus for holding and the aligning plurality of elongated rivet fasteners for driving through apertures in an upper belt fastener plate and through a belt and into apertures in a lower belt fastener plate, said apparatus comprising:

a base means for supporting the belt and the rivet fasteners and having anvils means thereon for deforming the lower ends of said rivets, a guide block for positioning over the upper belt plate fasteners and having a plurality of elongated vertically extending passageways therein each for receiving an elongated fastener and for guiding the same in a vertical movement into the apertures in the upper plate fasteners and through the belt to the apertures in the lower plate fastener, means interconnecting said base means and said guide block to locate said guide block in alignment with the apertures in the upper plate fasteners and thereby with respect to apertures in said lower plate fasteners, a belt clamp means clamping the belt to said base means, positioning means extending between the guide block and said belt clamp to assist in positioning the guide block, said belt clamping means comprising a pair of belt clamp bars each clamping a separate belt end to said base means, said positioning means comprising a pair laterally extending ears on said guide block for abutting the respective clamp bars and for centering the guide block therebetween.

14. An apparatus for applying fasteners to a set of upper and lower plate belt fasteners with a belt therebetween, said apparatus comprising:

a base means underlying and holding the lower belt fasteners in a predetermined relationship to the belt end, a clamping bar positioned over the tops of the upper plate fasteners and secured to the base means, registering means on said clamping bar for registering engagement with the upper plate fasteners, guide block having a plurality of apertures each for receiving and holding a fastener therein and for guiding the same for downward movement into and through the belt and aligned apertures in the respective upper and lower plate belt fasteners, means for securing said guide block to said clamping bar and in alignment with the apertures in the upper belt fasteners, said clamping bar extending across the belt with opposite ends thereof being secured to said base means, said registering means comprising depending projections on said clamping bar for engaging portions of the upper plate belt fasteners to align the bar and upper plate belt fasteners.

15. An apparatus for applying fasteners to a set of upper and lower plate belt fasteners with a belt therebetween, said apparatus comprising:

a base means underlying and holding the lower belt fasteners in a predetermined relationship to the belt end, a clamping bar positioned over the tops of the upper plate fasteners and secured to the base means, registering means on said clamping bar for registering engagement with the upper plate fasteners, guide block having a plurality of apertures each for receiving and holding a fastener therein and for guiding the same for downward movement into and through the belt and aligned apertures in the respective upper and lower plate belt fasteners, and means for securing said guide block to said clamping bar and in alignment with the apertures in the upper belt fasteners;

said guide block having an elongated groove with said clamping and securing means being extended through said groove in the guide block to assist in locating said guide block.

16. An apparatus for applying fasteners to a set of upper and lower plate belt fasteners with a belt therebetween, said apparatus comprising:

a base means underlying and holding the lower belt fasteners in a predetermined relationship to the belt end, a clamping bar positioned over the tops of the upper plate fasteners and secured to the base means, registering means on said clamping bar for registering engagement with the upper plate fasteners, guide block having a plurality of apertures each for receiving and holding a fastener therein and for guiding the same for downward movement into and through the belt and aligned apertures in the respective upper and lower plate belt fasteners, means for securing said guide block to said clamping bar and in alignment with the apertures in the upper belt fasteners, a pair of belt clamp bars being clamped to the base means and each clamping a belt end against shifting, and means on said guide block for extending to and abutting each of said belt clamp bars to locate and to hold the guide block therebetween.

17. A guide block for use with belt fastener plates having an array of apertures therein each to receive a fastener, said guide block comprising:

a block body for positioning over the belt body and having a plurality of elongated vertically extending passageways therein disposed in array complementary to the array of apertures, each of said passageways receiving an elongated fastener and for guiding the same in a vertical movement, means in the lower ends of said passageways for centering and holding the fasteners;

registering means on said guide block for registering the guide block relative to the belt fastener plates with the apertures in alignment with the passageways in said guide block body, and means associated with said guide block body for securing said guide block in the registered position over said plate fasteners and against movement during the driving of the fasteners from the passageways and into and through the apertures in the belt fastener plates;

said guide block having a longitudinally extending channel in the lower portion thereof for receiving a bar therein, said securing means including vertically extending bores in said guide block body for receiving threaded screws for threading into the bar.

* * * * *